Patented Dec. 25, 1951

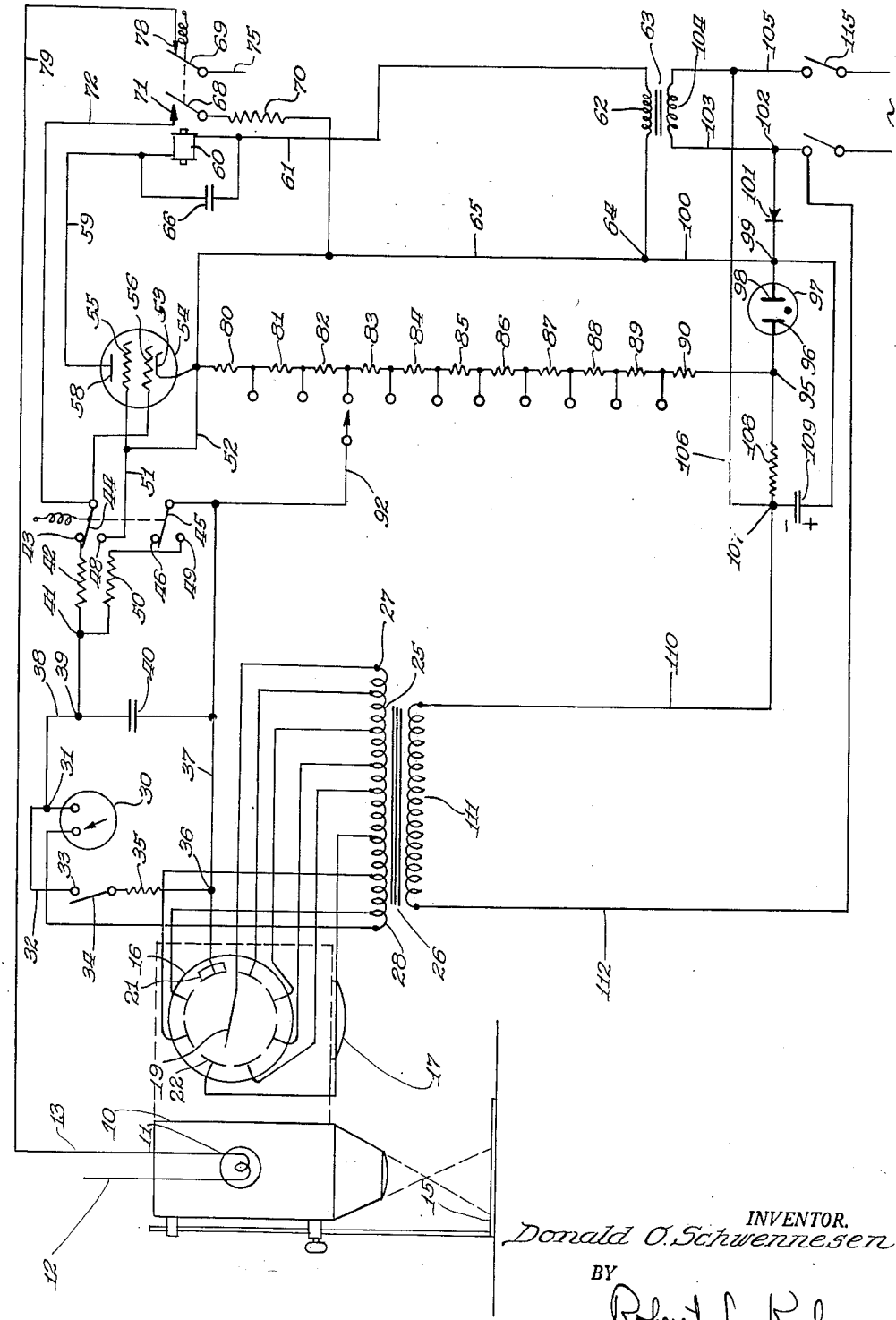

2,579,764

UNITED STATES PATENT OFFICE 2,579,764

TIMER FOR CONTROLLING THE OPERATION OF PHOTOGRAPHIC ENLARGERS

Donald O. Schwennesen, Chicago, Ill.

Application December 9, 1948, Serial No. 64,360

4 Claims. (Cl. 250—217)

This invention relates to an electrical apparatus and particularly to a timer for controlling the operation of photographic enlargers. Photographic enlargers have become quite popular because of the vogue of small cameras using moving picture film. As a rule, many of the pictures must be enlarged for enjoyment and for this reason enlargers have gone into extensive use.

As is well known, the quality of an enlargement is determined to a substantial degree by the duration of exposure of the paper. A substantial number of operators of such enlargers are relatively inexperienced or do not use the enlargers often enough to acquire experience. It is therefore desirable to provide a suitable timer which will control the exposure during enlargement and make allowances for variations in light from the projector forming part of the enlarger and also for the density of the negative.

This invention provides a simple and inexpensive timer which may be a separable accessory and added to any enlarger. The invention in general provides a photo-electric cell which receives a selected part or all of the enlarged image as reflected from the surface of the sensitive paper. This photo-electric cell translates the enlarging image into a current of electricity and integrates such current with respect to time. By means of suitable control systems, the time integral of the light impressed upon the photo-electric cell serves to determine the operating cycle of the enlarger.

In order that the invention may be understood it will be explained in connection with the drawing wherein the figure shows a diagrammatic form of a system embodying the invention.

Enlarger 10 may be of any desired construction having lamp 11 energized by wires 12 and 13. Enlarger 10 may be provided with any suitable lens system and diaphragm control all well known in the art. Enlarger 10 is adapted to project an enlarged image upon support 15 carrying suitable enlarging paper for printing. The enlarger and support are well known and require no detailed description.

Rigidly attached to enlarger 10 and movable therewith for focusing and other purposes is an assembly comprising photo-electric cell 16 and lens 17 disposed in a suitable casing, not shown. It is understood that the casing protects cell 16 from any light except what passes through lens system 17. Lens system 17 is adapted to receive reflected light from part or all of the photographic paper on support 15. Lens 17 is adapted to focus an image upon cathode 19 of cell 16.

While photo-electric cell 16 may be any one of a number of types, it is preferably of a type well known on the market wherein an electronic multiplier is combined therewith. Thus for example such a tube, under type number 931A is sold by Radio Corporation of America and by other companies. Such a cell has light sensitive cathode 19 and anode 21 with a plurality of accelerating electrodes 22. The detailed construction of such a photo-electric cell and multiplier are well known and described in numerous patents and publications and no attempt is made to show or describe such construction. The diagrammatic showing of this tube is in accordance with accepted practice as shown in service books of the tube makers.

Accelerating electrodes 22 are connected by wires to taps on secondary 25 of transformer 26. Cathode 19 of the cell is connected to one end 27 of winding 25 while the other end 28 of this winding is connected by a wire to one terminal of meter 30. Meter 30 has its other terminal connected to junction 31. Junction 31 is connected by lead 32 to switch contact 33 with which cooperates movable contact 34. Movable contact 34 is connected through suitable resistor 35 to junction 36 on wire 37 going to anode 21. Junction 31 is connected by wire 38 to junction 39. Between junction 39 and wire 37 is connected condenser 40.

Junction 39 is connected to junction 41 and this junction is connected by resistor 42 to switch point 43. Cooperating with switch point 43 is movable switch contact 44. Movable switch contact 44 is mechanically tied to movable switch contact 45 cooperating with switch contact 46 which is dead. Movable contacts 44 and 45 also cooperate with switch contacts 48 and 49 as shown. These movable contacts are biased to this position but may be momentarily moved to the other position for starting exposure cycle. Contact 49 is connected through resistor 50 back to junction 41. Contact 48 is connected by wire 51 to wire 52. Wire 52 connects cathode 53 of gas tube 54 and grid 55 of this same tube.

Tube 54 is of the type having a thermionic cathode and a gas at a suitable pressure therein and adapted to be triggered by a suitable potential applied to one or more control grids. Such tubes may be energized with alternating current between the cathode and anode and upon the occurrence of a predetermined potential at the control grid, the tube will break down and conduct. As is well known, such gas tubes cannot be controlled once conduction begins unless the anode to cathode circuit is broken. Thus by energizing with alternating current such as 60 cycles, the control grid may regain control 60 times per second. Such grid control tubes are available on the market and are adapted for a wide variety of uses.

Tube 54 has its control grid 56 connected to movable switch contacts 44. Tube 54 has anode 58 connected by wire 59 to relay 60. Relay 60 has its other terminal connected by wire 61 to transformer secondary 62 of transformer 63. The circuit from transformer secondary 62 continues to junction 64 then along wire 65 back to cathode 53 of tube 54. Condenser 66 of suitable capacitance is connected across the winding of relay 60 and serves to hold the relay when the same is energized by pulsating current.

Relay 60 has movable contacts 68 and 69 normally biased to an open and closed circuit position respectively. Thus movable contact 68 of the relay is connected through resistor 70 to wire 65. Movable contact 68 cooperates with fixed contact 71 which is connected to wire 72 back to movable contact 44 of the starting switch. Movable contact 69 of the relay is connected by wire 75 to one terminal of a transformer or other source of potential for enlarger lamp 11. The other terminal for this lamp is wire 12 and is connected to the other terminal of this same source of lighting current. Movable contact 69 cooperates with fixed contact 78 which is connected by wire 79 to wire 13 of the enlarger lamp.

Cathode 53 of gas tube 54 is connected to resistors 80 and 90 inclusive all connected in series. Any desired junction of resistors 81 to 90 inclusive may be connected to wiper contact 92. Resistors 81 to 90 inclusive are preferably logarithmically related with the smallest resistor being 81 and the largest being 90. Resistor 80 is so selected as to provide for predetermined operation of the gas tube and condenser charging system. The remaining condensers are added to modify this and provide for a control or variation. Instead of separate resistors 81 to 90 inclusive may all be equal and means may be provided for securing a logarithmic variation of travel of wiper contact 92 along the resistors. Inasmuch as obtaining a logarithmic variation of resistance is well known in the art, and since various methods are known, it will be assumed that such methods may equally well be used.

Wiper contact 92 is connected back to wire 37 and movable contact 45 of the starter switch. The series of resistors 81 to 90 inclusive have their bottom terminal 95 connected to cathode 96 of a two element regulator tube 97. Gas tube 97 is of the type used for maintaining a constant potential and is well adapted to provide voltage regulation. It may be omitted if desired and line voltage be used directly. Thus as an example, tube 97 may be one of the types of tubes on the market as VR-105. Such a tube is adapted to maintain about 105 volts across its terminals over substantial variations of impressed potential. Tube 97 has anode 98 connected to junction 99. Junction 99 is connected by lead 100 up to junction 64 and is also connected through rectifier 101 to junction 102. Junction 102 is connected by wire 103 to primary 104 of transformer 63. Primary 104 has its other terminal connected to wire 105. Wire 105 is connected by wire 106 to junction 107. Between junction 107 and junction 95 there is connected resistor 108 while between junction 107 and junction 99 there is connected condenser 109. From junction 107 wire 110 goes to primary 111 of transformer 26, primary 111 having its other terminal connected by wire 112 to wire 103. Wires 103 and 105 are connected by switch 115 to any suitable source of alternating current.

The operation of the system is as follows:

Assume that the system has been deenergized by switch 115 being open. Now if switch 115 is closed, the system is ready for use. When switch 115 is closed, gas tube 54 starts firing since the grid and cathode are at the same potential. The firing circuit may be traced as follows: transformer winding 62, wire 61, relay winding 60, wire 59, anode 58, cathode 53, wire 65 back to winding 62. Thus relay 60 is energized. The circuit for enlarger lamp 11 is opened at relay contacts 69 and 78. At the same time a grid leak circuit is established as follows: control grid 56, wire 72, relay contacts 71 and 68, resistor 70 to cathode 53. This grid leak circuit maintains the bias of control grid 56 at a constant firing value and prevents accidental timer operation because of leakage currents from the photo-cell. The system as thus described is in a stand-by condition.

If the timer is to be operated for an exposure cycle, the starting switch is momentarily depressed. This moves contact 45 against contact 49 and at the same time contact 44 moves away from 43 and closes against contact 48.

When contact 45 closes on contact 49, a discharge circuit including resistor 50 is closed around condenser 40. The time constant of this circuit is short enough so that condenser 40 is completely discharged by the momentary closure of the starting switch. At the same time, contacts 44 and 48 complete a circuit between control grid 56 and cathode 53. Thus gas tube 54 is maintained in a firing condition and relay 60 still remains energized.

It will be noted that when condenser 40 is connected across resistor 50, contact 45 drops the potential of both sides of condenser 40 below the potential of cathode 53. This is due to the connection of contact 45 to movable contact 92 on the resistor network. The lower a point is on the network, the more negative that point is to cathode 53. When the starter switch is released, terminal 39 of condenser 40 is connected to control grid 56 of gas tube 54, through resistor 42. Hence the control grid potential becomes negative to the cathode and tube 54 ceases firing. This deenergizes relay 60 and the circuit for lamp 11 is closed. This begins an exposure cycle. When the relay releases, the grid leak circuit is also opened. Light acting upon photo-cell 16 sets up a current through the cell. The circuit through the cell may be traced as follows: transformer terminal 28, meter 30, junction 31, wire 38, condenser 40, wire 37, junction 36, anode 21, cathode 19 to terminal 27 of the transformer. The polarity of the current charging condenser 40 is such as to render junction 39 increasingly positive with respect to wire 37. Thus the potential of control grid 56 gradually rises until it reaches a firing value. During the charging of condenser 40 by the cell output, the lower condenser terminal (wire 37) remains at a fixed negative potential because of its connection to wiper 92. When tube 54 fires, relay 60 will operate and extinguish the enlarger lamp.

For testing purposes, switch 34 may be closed against contact 33. This cuts out condenser 40 and the meter registers the rectified cell output current. In the above circuit analysis no attempt has been made to trace the subsidiary multiplier circuits, these being the same as usual.

It is clear that resistor 80 will provide the minimum negative bias for determining an exposure cycle. This may be set to any desired value. As wiper 92 is moved along the resistors away from cathode 53, an increasing initial negative bias is impressed upon control grid 56 of gas tube 54. Thus the lower the initial bias, the longer will condenser 40 have to charge to reach the firing point for gas tube 54. By providing a logarithmic potential divider, the exposure time may be in simple and arithmetical proportion. This, however, may be varied to suit individual requirements. Resistor 42 in the grid circuit of gas tube 54 may be omitted if desired. The same is true of regulator tube 97. This is convenient however since it stabilizes the operation of the voltage divider network including resistors 80 to 90 inclusive.

One example of a system embodying the present invention is as follows: Gas tube 54 may be type 2051 available in the market. Resistor 80 may have a value of 2600 ohms. Resistors 81 to 90 inclusive may have the following values—88; 1200; 1760; 2480; 4020; 4950; 7050; 9950; 14,000 and 4500. Resistor 108 may be 4000 ohms while gas regulator tube 97 may be type VR–105. Condensers 40 and 109 may each have a value of 10 microfarads while condenser 60 may have a value of 20 microfarads. Photo-electric cell 16 was type 931A. The potential developed across secondary 62 was 150 volts. The relay was a standard relay. Resistor 42 had a value of 5 megohms while resistor 70 had a value of 20 megohms. Resistor 50 had a value of 1000 ohms while resistor 35 had a value of 100,000 ohms. Meter 30 and the switch are provided so that the meter may be cut out or cut in to show the current passed by the photo-electric cell. The meter reading is useful to show that the photo-cell is receiving light from a desired part of the enlarger easel.

What is claimed is:

1. A system for controlling the duration of energization of a lamp for photographic exposures, said system comprising a photo-electric cell having cathode and anode, a condenser and source of potential connected in series with said cathode and anode so that said cell controls a charging current to said condenser, said condenser having one terminal whose potential rises positively with respect to the other condenser terminal during charging, a grid controlled gas tube having thermionic cathode, control grid and anode, a connection including a first position of a switch from said one condenser terminal to said control grid, a source of alternating potential and relay in series connected to said gas tube cathode and anode, a bias resistor having one terminal connected to said gas tube cathode, a source of direct potential having its positive terminal connected to said gas tube cathode and its negative terminal connected to said other terminal of said bias resistor, a connection between the other terminal of said condenser and a point on said bias resistor, a second switch connected across said condenser for short circuiting said condenser, a connection including a second position of said first named switch for connecting said gas tube control grid and cathode, a lamp energizing circuit including normally engaging contacts for said relay, said two switches being tied together for simultaneous operation with said first switch normally connecting said one condenser terminal to said gas tube control grid and said second switch normally being open whereby in the absence of light upon said cell, said condenser remains in a discharged condition and said gas tube is in firing condition with the relay being energized and maintaining the lamp circuit open and upon operation of said switches to an off-normal position, the one terminal of said condenser is disconnected from the gas tube control grid and connected to the other terminal of said condenser with the condenser being short-circuited and the potential of both terminals thereof being negative to the gas tube cathode, and upon release of said switches back to normal, said control grid of the gas tube is dropped below its cut-off potential to cut the gas tube off, said cell being adapted to gradually charge said condenser and raise the potential of said one condenser terminal and the gas tube control grid to the firing point whereupon said relay is energized and opens said lamp circuit.

2. The circuit of claim 1 wherein a connection including a grid resistor and normally open relay contacts is disposed between the control grid and cathode of said gas tube.

3. The system according to claim 1 wherein said bias resistor has a plurality of taps thereon with the connection from the lower condenser terminal being made from a potentiometer wiper, said taps being so selected that the variation of bias resistance along the taps is logarithmic in nature.

4. The system according to claim 1 wherein a meter is connected in series with the cell to show cell current and wherein a connection including a switch is provided across the condenser whereby when the switch is closed said condenser is shorted out and the meter may indicate cell current.

DONALD O. SCHWENNESEN.

REFERENCES CITED

The following references are of record in the file of this patent:

UNITED STATES PATENTS

| Number | Name | Date |
|---|---|---|
| 1,973,512 | Smith | Sept. 11, 1934 |
| 2,232,373 | Dorst | Feb. 18, 1941 |
| 2,274,158 | Penther | Feb. 24, 1942 |
| 2,443,058 | Simmon | June 8, 1948 |